United States Patent
Busayarat et al.

(10) Patent No.: US 11,146,654 B2
(45) Date of Patent: *Oct. 12, 2021

(54) MULTITIER CACHE FRAMEWORK

(71) Applicant: Home Box Office, Inc., New York, NY (US)

(72) Inventors: Sata Busayarat, Seattle, WA (US); Jonathan David Lutz, Seattle, WA (US); Allen Arthur Gay, Shoreline, WA (US); Mei Qi, Bellevue, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,028

(22) Filed: Aug. 28, 2019

(65) Prior Publication Data

US 2019/0387071 A1 Dec. 19, 2019

Related U.S. Application Data

(63) Continuation of application No. 15/167,321, filed on May 27, 2016, now Pat. No. 10,404,823.

(51) Int. Cl.
*H04L 29/08* (2006.01)
*G06F 16/245* (2019.01)
(Continued)

(52) U.S. Cl.
CPC ...... *H04L 67/2847* (2013.01); *G06F 12/0811* (2013.01); *G06F 12/0868* (2013.01);
(Continued)

(58) Field of Classification Search
USPC .......................................................... 709/217
See application file for complete search history.

(56) References Cited

U.S. PATENT DOCUMENTS 6,542,964 B1 4/2003 Scharber
6,732,237 B1 5/2004 Jacobs et al.
(Continued)

FOREIGN PATENT DOCUMENTS

WO 2014/025972 A2 2/2014
WO 2016064049 A1 4/2016

OTHER PUBLICATIONS

Non-Final Office Action received for U.S. Appl. No. 15/167,321 dated Sep. 20, 2018, 32 pages.
(Continued)

*Primary Examiner* — Hermon Asres
(74) *Attorney, Agent, or Firm* — Amin, Turocy & Watson, LLP

(57) ABSTRACT

The described technology is directed towards a cache framework that accesses a tier of ordered caches, in tier order, to satisfy requests for data. The cache framework may be implemented at a front-end service level server, and/or a back end service level server, or both. The cache framework handles read-through and write-through operations, including handling batch requests for multiple data items. The cache framework also facilitates dynamically changing the tier structure, e.g., for adding, removing, replacing and/or reordering caches in the tier, e.g., by re-declaring a data structure such as an array that identifies the tiered cache configuration.

20 Claims, 14 Drawing Sheets

(51) Int. Cl.
  *G06F 12/0871* (2016.01)
  *G06F 12/0868* (2016.01)
  *G06F 12/0811* (2016.01)
(52) U.S. Cl.
  CPC ........ *G06F 12/0871* (2013.01); *G06F 16/245* (2019.01); *H04L 67/2885* (2013.01); *G06F 2212/1016* (2013.01); *G06F 2212/314* (2013.01); *G06F 2212/601* (2013.01)

(56) References Cited

U.S. PATENT DOCUMENTS

| | | | | |
|---|---|---|---|---|
| 7,289,964 | B1* | 10/2007 | Bowman-Amuah | G06F 9/5038 705/1.1 |
| 8,180,720 | B1 | 5/2012 | Kovacs et al. | |
| 2004/0030870 | A1* | 2/2004 | Buser | G06F 9/30181 712/227 |
| 2004/0250011 | A1* | 12/2004 | Chen | G11C 7/10 711/103 |
| 2005/0050455 | A1 | 3/2005 | Yee et al. | |
| 2010/0095053 | A1* | 4/2010 | Bruce | G06F 3/064 711/103 |
| 2012/0072656 | A1* | 3/2012 | Archak | C12Q 1/6886 711/104 |
| 2012/0089700 | A1* | 4/2012 | Safruti | H04L 67/2842 709/217 |
| 2014/0072656 | A1* | 3/2014 | Mitchell | B01J 19/0006 424/661 |
| 2015/0074222 | A1 | 3/2015 | Liang et al. | |

OTHER PUBLICATIONS

International Search Report and Written Opinion received for PCT Application Serial No. PCT/US2017/034746 dated Aug. 10, 2017, 14 pages.
Colombian Office Action for Colombian Application No. NC2018/0014245 dated Sep. 25, 2020, 24 pages.
EP Office Action for EP Application No. 17728419.7 dated Feb. 17, 2021, 7 pages.
Mexican Office Action for Mexican Application No. MX/a/2018/014628 dated Jul. 8, 2021, 4 pages.

* cited by examiner

MULTITIER CACHE FRAMEWORK

CROSS-REFERENCE TO RELATED APPLICATIONS

This application is a continuation of pending U.S. patent application Ser. No. 15/167,321, filed on May 27, 2016, entitled "MULTITIER CACHE FRAMEWORK". The entirety of the aforementioned application is hereby incorporated herein by reference.

BACKGROUND

Data caching is a significant factor in providing rapid content retrieval while avoiding the overloading of content servers with content access requests. A problem with caching is that caches have many variables that need to be considered to provide a desired outcome.

One consideration is whether to use a FIFO (first-in, first out) cache or a LRU (least recently used) cache. Another consideration is the cache size, as in general, the more data that can be cached, the greater the cache hit rate. However cache size is generally limited to a percentage of available memory, which is a valuable resource. Also, the longer the retention time of cached data the greater the hit rate, but serving stale data, at least not too stale, is not acceptable in most scenarios. Thus, the type and amount of data to be cached are considerations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards a cache framework configured to access a tier of caches to attempt to find data to satisfy a data request. In one or more implementations, the cache framework is coupled to a data structure that identifies a plurality of caches in a cache tier order. The cache framework attempts to return the data in response to a data request, including to read the data structure to access each cache according to the tiered order until the data is obtained from a cache, or to return an indication that at least part of the data was not obtained from a cache.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
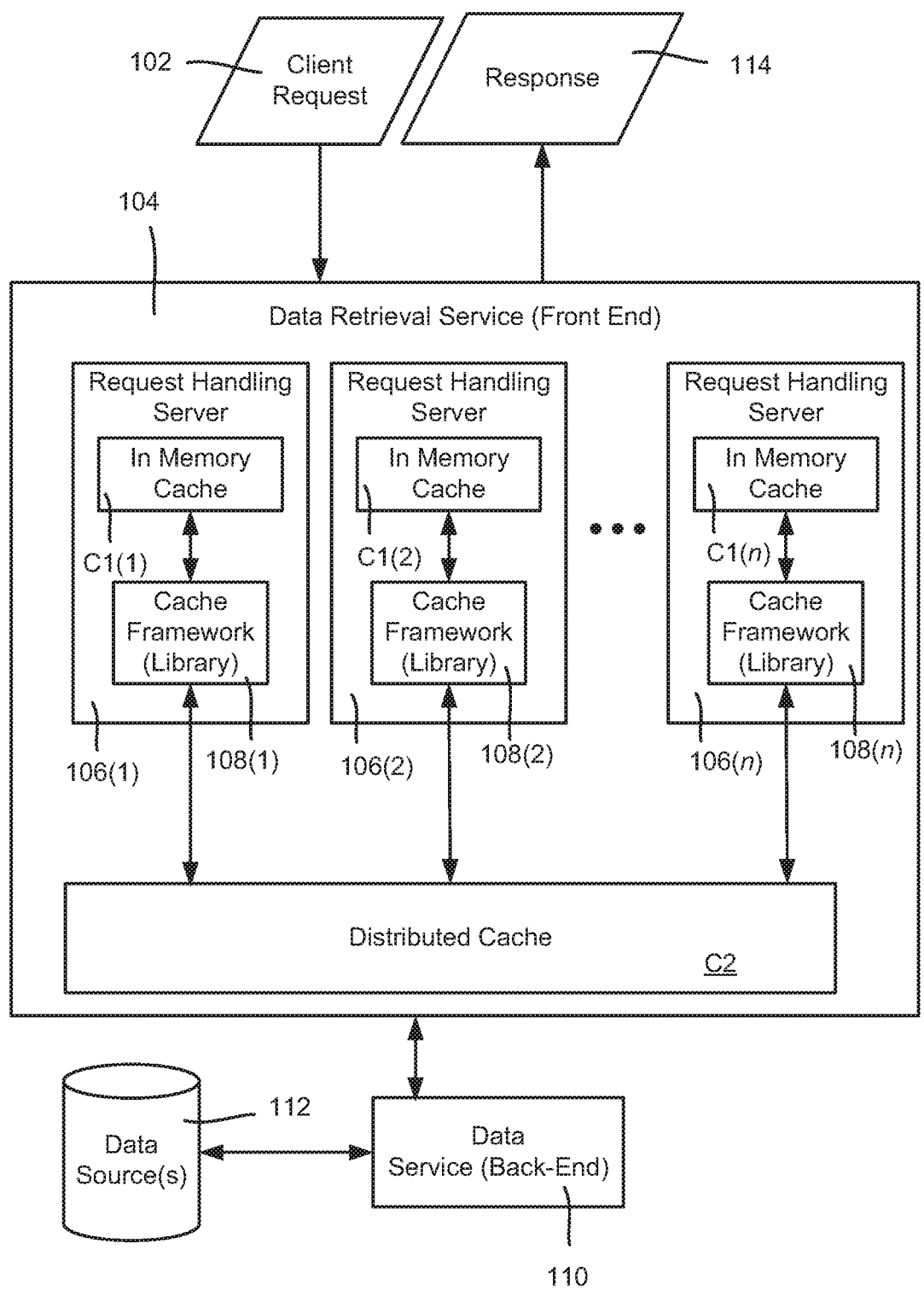
FIG. 1 is an example representation of components that handle requests for data, including via a multitier cache framework, according to one or more example implementations.

Various aspects of the technology described herein are generally directed towards a cache framework (e.g., an instantiated library) that accesses data caches based upon a tiered set of caches currently available, e.g., with the cache identifiers maintained in an array or other suitable data structure. In general, caching operations are handled by the framework, and thus data retrieval is largely decoupled from the requesting entity or entities, e.g., client requestors and/or a data retrieval system, e.g., a front end data service.

The tiered set of caches currently available is dynamic, in that the set may be extended or reduced with respect to the number and relative positioning of the tiers. For example, at certain times such as during times of a high request volume, resources may be reallocated to provide at least one additional cache in the tiered set, e.g., by declaring a different set of caching tiers in the array. At times of less request volume, one or more caches may be removed from the array, and thus from the system, with the resources reallocated for other purposes. The use of the cache framework generally makes the caching architecture transparent to the rest of the data retrieval system.

In some implementations, a data retrieval service requests the cache framework to retrieve requests from whatever cache has it, or return an indication to the data retrieval service for any item not found, e.g., a cache miss. In this "hybrid" approach, the data retrieval service can take additional steps to obtain (e.g., build) the requested item from one or more other data sources, e.g., a back-end data service. The data retrieval service may return a response to a client's individual (e.g., "Get") request, or may return a batch of items in response to a client's batch request.

In alternative implementations, the cache framework retrieves each request from whatever cache has it, or from one or more backing data sources if not (which may be made to appear to the cache framework as another cache in the tier). In this "peer" approach, the cache framework (ordinarily) obtains the data, and thus does not return a cache miss. Such a cache framework also handles batch requests. The cache framework may return the batch of items as a complete set; alternatively, the cache framework may return the items individually as they are retrieved, which the client can use as desired. In any event, when a requestor requests a batch of items, the requestor need not have any idea of each item's cached or not-cached status, and if cached, need not have any idea of the cache tier level at which the data is cached.

It should be understood that any of the examples herein are non-limiting. For instance, some of the examples refer to returning catalog items, such as built from various data sources to represent television content such as movies or shows. However, the multitier cache framework is independent of any particular type of data being cached. As another example, a FIFO cache is one type of cache that may benefit from the technology described herein, however the technology is not limited to FIFO caches. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data caching in general.

FIG. 1 is a block diagram representing example components that may be used to provide and work in conjunction with multitier caching as described herein. In FIG. 1, client requests 102 are received at a data retrieval service 104, (e.g., a front-end, client interfacing data service). One such data retrieval service 104 comprises a cluster of generally load-balanced server machines 106(1)-106(n). Any or all of the servers/server machines may comprise one or more physical machines and/or virtual machines, and thus a "server" as used herein may span multiple machines and/or share machine resources with one or more other servers.

In one or more implementations, the load-balanced server machines 106(1)-106(n) each have a cache framework, shown as cache frameworks 108(1)-108(n), respectively. These may be instantiated as libraries, for example. The exemplified load-balanced server machines 106(1)-106(n) also each have an in-memory cache C1(1)-C1(n), respectively.

Also shown in FIG. 1 is a distributed cache C2. In a typical implementation, the distributed cache C2 is larger than the individual in-memory caches C1(1)-C1(n) and has a higher hit rate; however the distributed cache C2 takes longer to access, e.g., via a network request to a Redis cache. Note that as used herein, the concept of "lower-level" and "higher-level" with respect to caches is somewhat similar to CPU caches in which the L1 cache is considered a lower-level cache than the L2 cache, and so on, with L1 checked before L2, and so on. Thus, in the examples herein, an in-memory cache such as C1(1) is considered to be at a lower level in the cache tier than the distributed cache C2.

Further shown in FIG. 1 is a data service 110 (e.g., a back-end data service) in conjunction with one or more data sources 112. In general, in one or more implementations, the cache framework (e.g., 108(1) of server 106(1)) sometimes does not find a requested data in any cache, e.g., neither server 106(1)'s in-memory cache C1(1) nor the distributed cache C2, and thus the framework 108(1) returns a cache miss or the like. Upon such an event, the data retrieval service (e.g., via the server 106(1)) communicates with the data service 110 to obtain the data item or items, e.g., build the response, which may have data returned from a plurality of data sources 112. In any event, the client gets some appropriate response 114 to its request (whether the data is returned as requested or some error response is returned).

Figure 2:
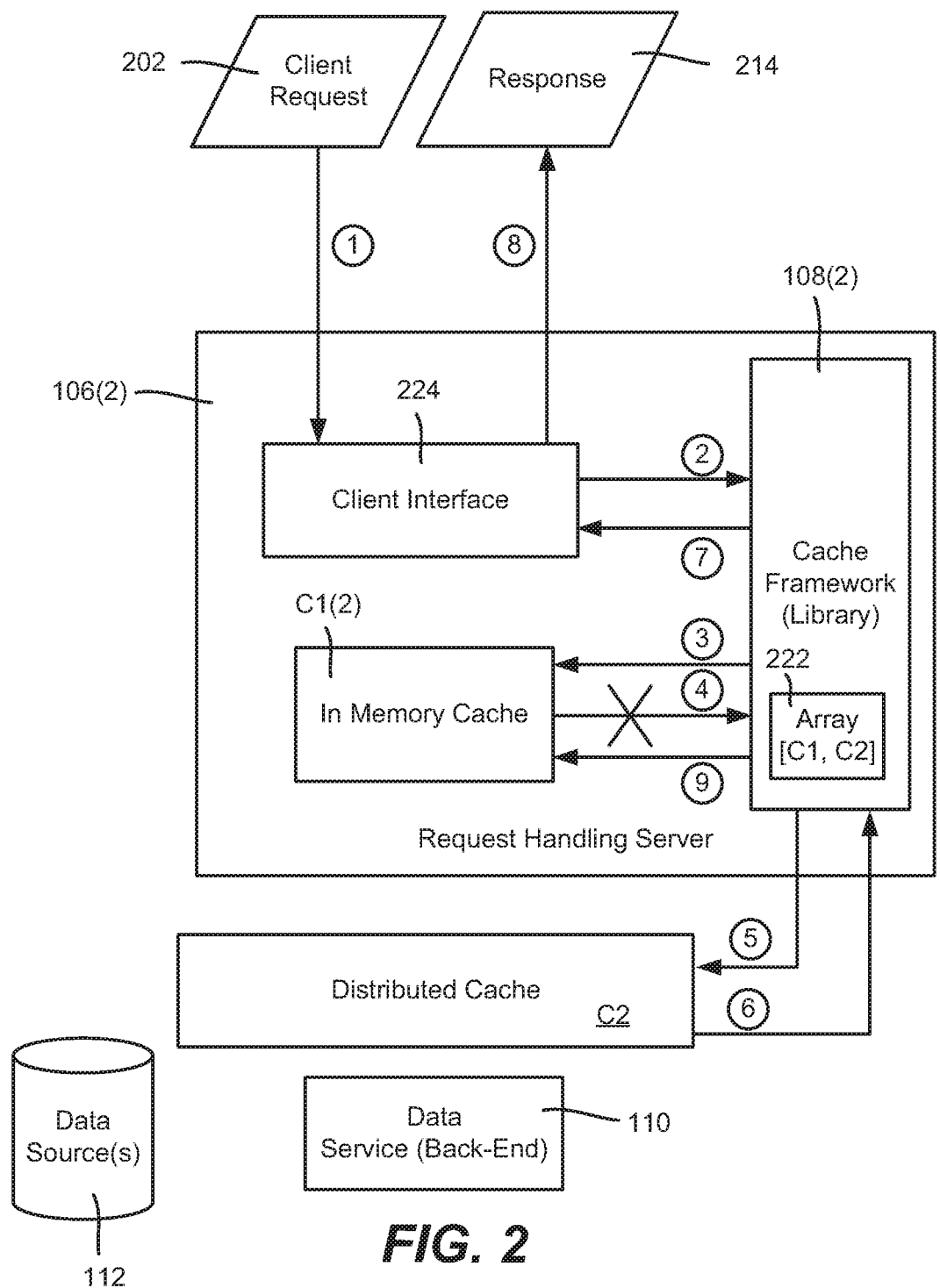
FIGS. 2-4 are example representations of components that handle requests for data, including based upon a read-through and write-through cache access order via a multitier cache framework, according to one or more example implementations.
Figure 3:
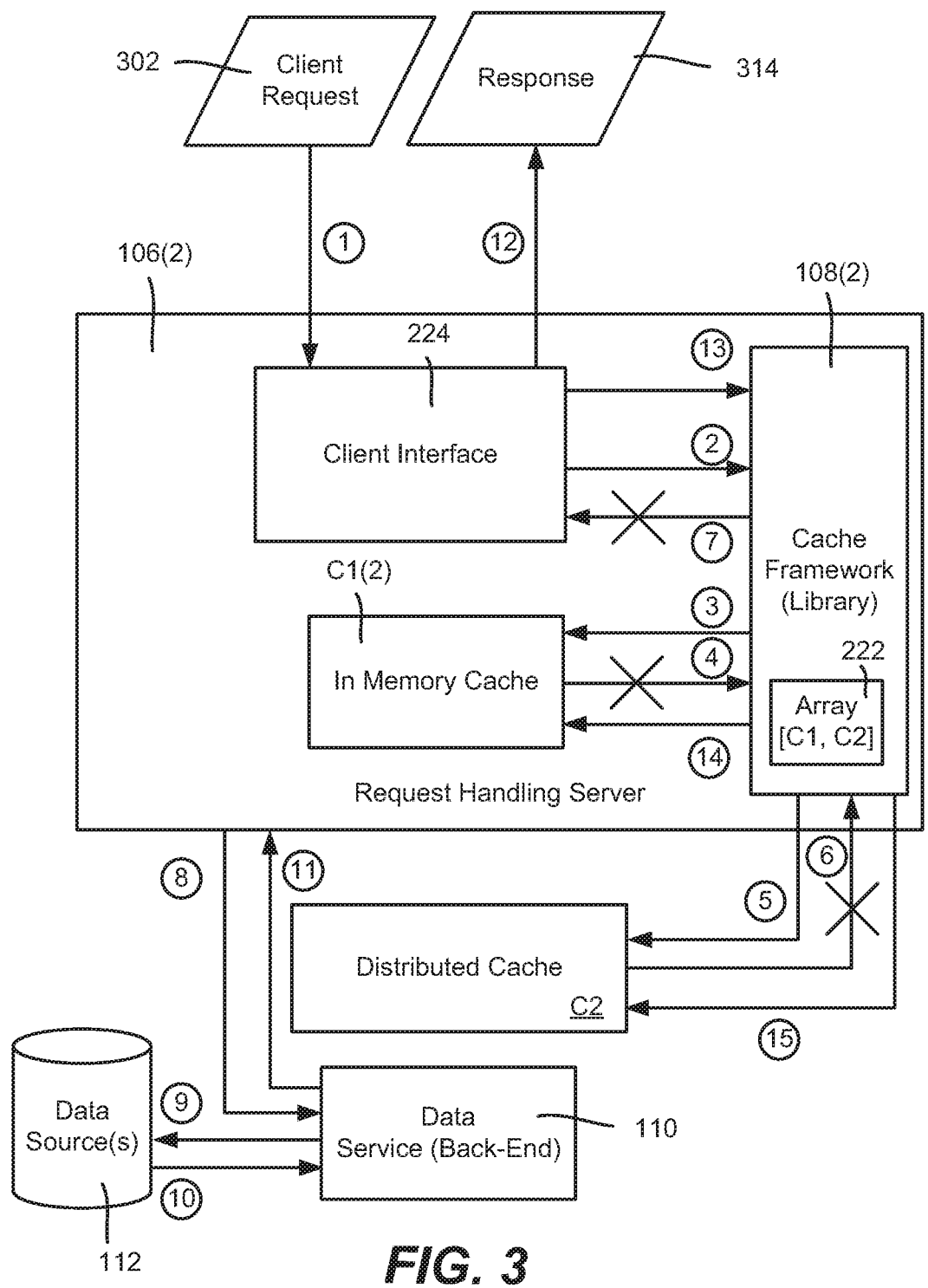

FIGS. 2 and 3 show a general model of how a cache framework (e.g., 108(2) of request handling server 106(2) of FIG. 1) may operate upon receiving client requests in an example implementation in which there are two tiered caches (in-memory cache C1(2) and distributed cache C2). In the examples of FIGS. 2 and 3, the cache framework 108(2) maintains an array 222 that identifies the tiered caches, in order, shown as [C1, C2] in this example. Note that the cache framework 108(2) knows of its server's local in-memory cache C1(2) and any shared cache or caches, e.g., the distributed cache C2 in FIGS. 2 and 3, but does not access any other server's in-memory cache. While an array 222 is shown, any suitable data structure may be used, and, for example, the cache identifiers may be conventional cache addresses or other information (e.g., network data) to allow rapid access to the caches.

In general, the cache framework 108(2) uses a dynamic read through, write through model. For data requests, the lowest level cache C1(2) is first accessed, with the data returned if hit or the next highest level accessed (distributed cache C2) if missed, and so on. Write through operations take place to any lower-level caches.

In general, when a user requests some content, e.g., a catalog item, the request handling server 106(2) goes to the cache framework 108(2), which in one implementation comprises a library with an array identifying one or more caches and a desired cache access (tier) order. More particularly, in the example of FIG. 2, a client request 202 (the arrow labeled one (1)) to a client interface 224 results in the cache framework 108(2) being invoked (arrow two (2)) to obtain the requested results. The cache access attempt is represented via arrow three (3), where the cache framework 108(2) first looks to the server's in memory cache C1(2). If found, the results are returned; this result, however, is straightforward and not shown in FIG. 2, which instead shows a cache miss at cache C1(2).

Thus, because the data is not found in the first cache C1(2), which in FIG. 2's example is signified by the "X" returned at arrow four (4), the cache framework library 108(2) goes to its next cache identified in the array, distributed cache C2, which is the cache shared in a network with other client servers such as in FIG. 1. This access attempt is shown via arrow five (5).

It should be noted that the labeled arrows are only examples of a general order of operations, and that at least some of the ordered operations may take place in a different order, and/or that additional operations may occur that are not labeled. Further, at least some operations corresponding to the labeled arrows may take place at least to some extent in parallel, and/or asynchronously. For example, a request for data may have an asynchronous promise for that data initially returned (wherein a "promise" in asynchronous programming environments is basically a placeholder in which data is returned when ready, sometimes referred to as a "future" or "delay") so that the requestor does not block awaiting the data, but may continue to perform other operations, with the actual data later returned to satisfy the promise.

Returning to the example, the cache framework 108(2) finds the requested data in the shared cache (arrow six (6)), and returns the content to the request handling engine, e.g., the client interface 224 (arrow seven (7)). The content may be reformatted as desired by the request handling server 106(2), e.g., in a response 214 with the data formatted as expected by the client (arrow eight (8)).

Any time a cache miss is detected, any data from a higher level cache (or higher data source or sources) are written into each lower level cache or caches. Thus, in the example of FIG. 2, the data obtained from the distributed cache C2 is written by the cache framework 108(2) into the in-memory cache C1(2), as represented by arrow nine (9).

The example of FIG. 3 is similar at first to the example of FIG. 2, in that the operations represented by arrows one (1) through five (5) are the same. Another client request 302 (the arrow labeled one (1)) to the client interface 224 results in the cache framework 108(2) being invoked (arrow two (2)) to obtain the requested results. The in-memory cache access attempt is represented via arrow three (3), where similarly the requested data is not found, as signified by the "X" returned at arrow four (4). Thus, the cache framework 108(2) goes to its next cache identified in the array, distributed cache C2, (shown via arrow five (5)).

Unlike the example of FIG. 2, in the example of FIG. 3 the cache framework 108(2) does not find the requested data in the shared cache C2, as signified by the "X" returned at arrow six (6). In this implementation, the cache framework 108(2) thus returns a cache miss to the client interface 224 (arrow seven (7)).

In this example "hybrid-approach" implementation, it is the responsibility of the request handling server 106(2) (or possibly some other component of the data retrieval service) to obtain the requested data. To this end, the request handling server 106(2) communicates with the (e.g., back-end) data service 110 (arrow eight (8)), which obtains (arrows nine (9) and ten (10)) the part or parts of the response from one or more of its own back-end caches (not shown) and/or data sources 112. For example, consider that the request is for a catalog item representing a movie; the response may contain a title, plot summary, cast and crew description, rating, representative image and so on, which may be obtained from various data sources 112.

The data service 110 returns the data to the request handling server 106(2), arrow eleven (11), from where the client interface 224 returns the data in a response 314 (arrow twelve (12)), again possibly formatting the data as needed by the client.

The client interface 224 (or other suitable component) also provides the data to the cache framework 108(2), shown via arrow thirteen (13). This is for writing through the data to the in-memory cache C1(2), arrow fourteen (14), and the distributed cache C2, arrow fifteen (15). Note that in one or more implementations, in the hybrid approach the caches are written in array order (lowest to highest), although in alternative implementations they could be written in any order, or in parallel.

Figure 4:
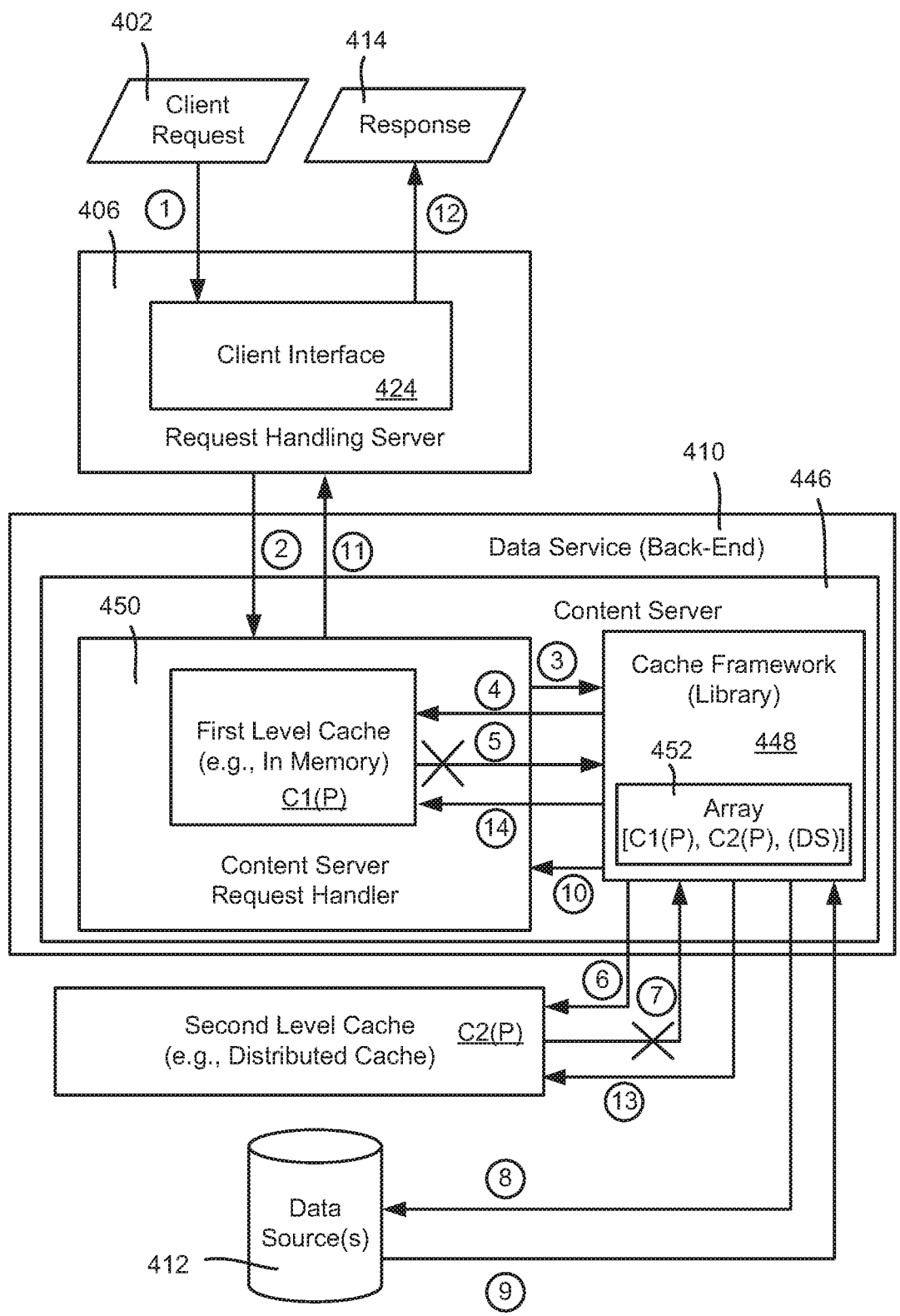

FIG. 4 shows an alternative "peer-approach" implementation in which requested data is either found in a cache or returned from a backing data source or sources. In this alternative implementation, there is no returning a "cache miss" from the cache framework; the requested data can be considered as always found and returned under normal circumstances (although under abnormal circumstances an error may be returned, such as if the requested data does not exist, a database is down, and so forth).

One possible use for a peer-approach implementation is to provide a data service (e.g., back-end) as in FIGS. 1-3. Thus, in one or more implementations the data service 410 of FIG. 4 is invoked when a client request comes into the request handling server 406, but the data is not found at that hybrid-approach level and needs to be obtained from the back-end data service 410. The data service 410 similarly may comprise a plurality of servers, one of which is shown as the content server 446 in FIG. 4, which instantiates a cache framework (library) 448 having a currently declared cache array 452.

As represented in FIG. 4, another client request 402 (the arrow labeled one (1)) is received at a client interface 424 of the request handling server 406. In this example, the requested data is not in any front-end cache, and thus (as in the above example of FIG. 3) the request handling server 406 needs to obtain the data to build the response. Thus, the data service 410 is called, with the request provided (e.g., via a load balancer) to a request hander component 450 or the like of a content server 446 (arrow two (2)).

In this example, the content server 446 also has an in-memory cache C1(P), (where "P" indicates the peer-approach), which the cache framework 448 called at arrow three (3) knows to look to first (arrow four (4)) to attempt to find the requested data. If found, the data is returned.

In this example of FIG. 4, the data is not found in cache C1(P), as represented via the "X" at arrow five (5), and thus the cache framework library 448 looks to a second level cache C2(P), e.g., a distributed cache shared among content servers of the data service 410. This attempt is shown as arrow six (6), which if found is returned. In this example, however, the second level cache attempt also results in a miss (the "X" at arrow seven (7)).

Unlike the hybrid approach, in the peer approach of FIG. 4, the cache framework 448 continues to attempt to obtain the data from one or more data sources 412, represented by arrow eight (8). Ordinarily, the data is available, that is, the request is for data that exists, the data sources 412 are operating properly and providing timely responses, and so on. Thus, the data is ordinarily obtained at arrow nine (9).

Note that in one or more implementations, the cache framework works on the basis of the constituent cache tiers being accessible through a common interface; non-cache data sources may be plugged into the framework by providing a wrapper that implements this interface. Thus, the cache framework 448 may have the data source(s) identified in its array 452, basically treating the data source(s) like another cache, e.g., a virtual cache. In alternative implementations, the cache framework 448 may be configured with knowledge of how to obtain the data from the data source(s) 412 following a cache miss at the last actual cache listed in the array, rather than return a cache miss.

The service 410 returns the data to the request handling server 406, arrow eleven (11), from where the client interface 424 returns the data in a response 414 (arrow twelve (12)). As described above, the data may be reformatted for the particular client, e.g., by the request handling server 406.

The cache framework 448 also writes the data to the distributed cache C2(P), shown via arrow thirteen (13), and the in-memory cache C1(P), arrow fourteen (14). Note that in this peer approach, the writes "bubble" back up as the value is being returned, whereby caches are written through in higher-to-lower cache order (opposite of the hybrid approach). One benefit is that the distributed cache (C2(P) in this example) is written first, thereby reducing the interval of time during which other servers can experience a cache miss (at that tier).

To summarize, in the hybrid approach, the caller of the cache framework receives the requested data found in a cache or is notified by the cache framework that the caller needs to obtain the data. In the peer approach, the caller of the cache framework receives the requested data as found in a cache or as returned from a backing data source or sources (which may be a "virtual cache" that the cache framework may consider another cache); in general the caller has no idea of where the data was retrieved, other than possibly that data is likely returned faster if cached.

Figure 5:
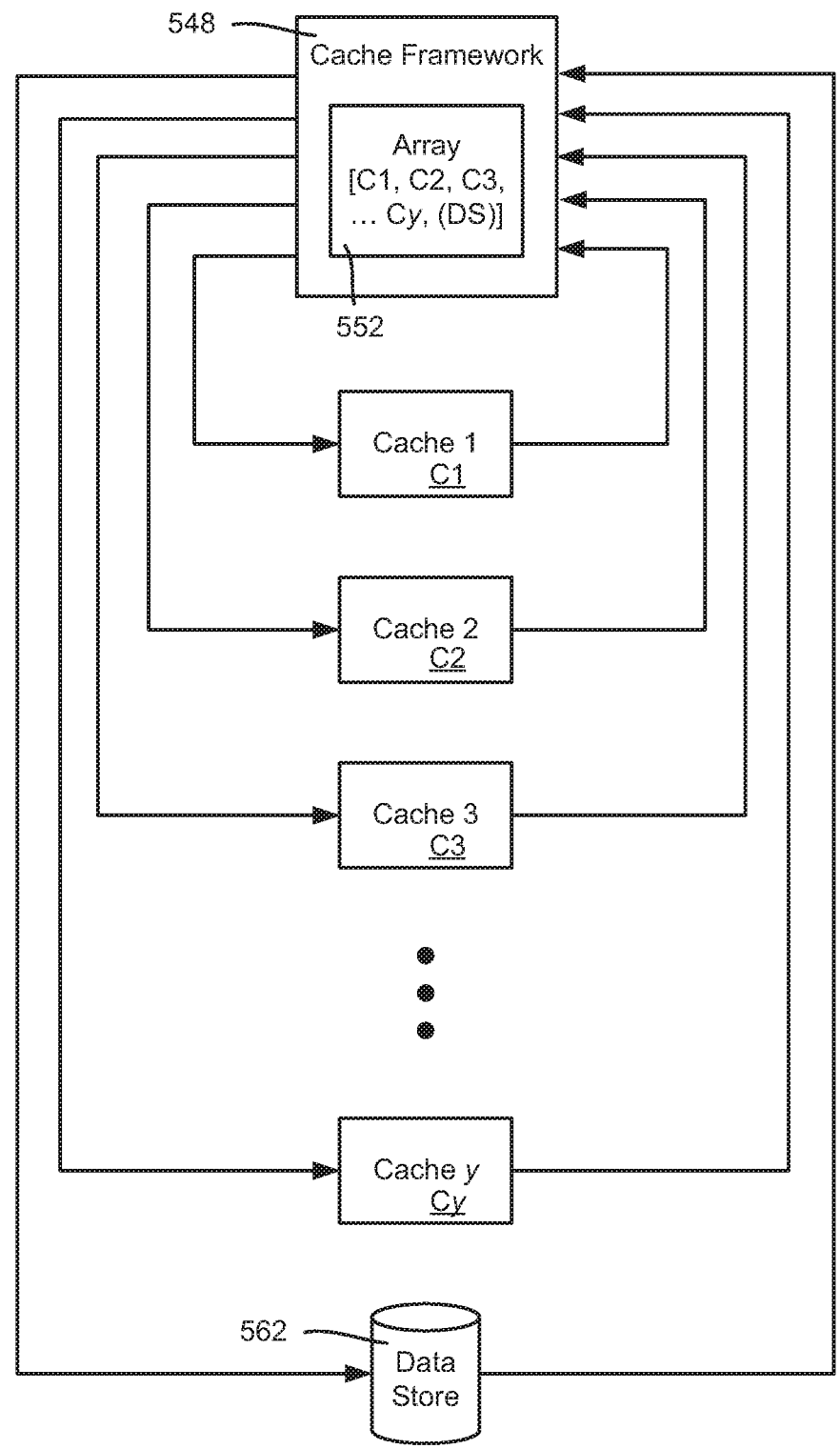
FIG. 5 is a block diagram showing an example of an arbitrary number of caches accessible via a cache framework, according to one or more example implementations.

FIG. 5 shows the concept of multitier caching with an arbitrary number of cache tiers C1-Cy. The cache framework 548 uses the declared array 552 to access each cache as needed. In FIG. 5, the peer approach is illustrated, as the last access location is the data store 562; however it is understood that multitier caching with an arbitrary number of cache tiers C1-Cy similarly works with the hybrid approach.

Figure 6A:
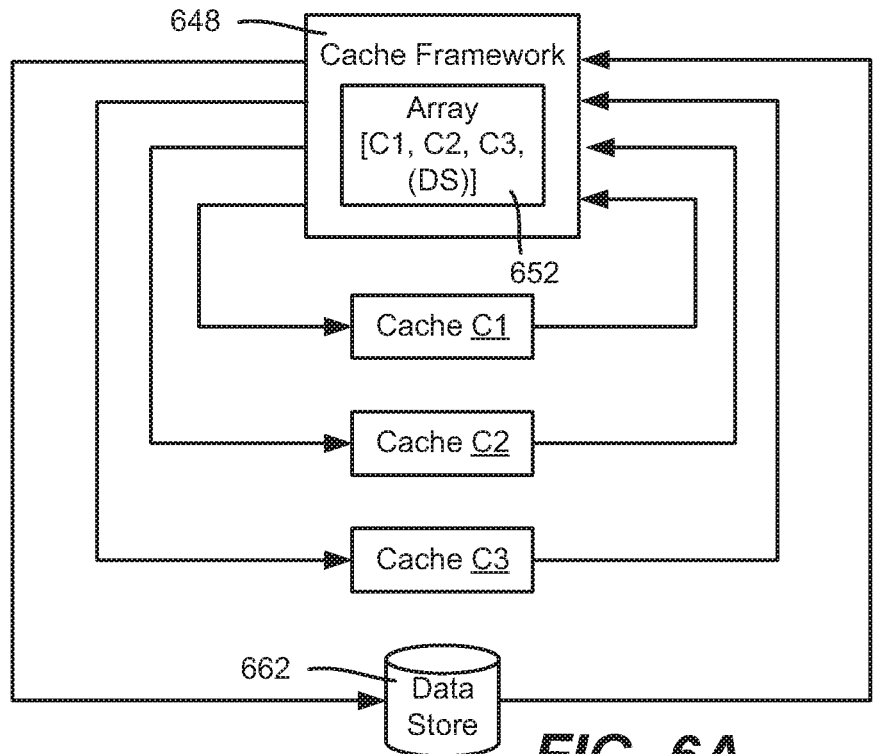
FIGS. 6A and 6B are block diagrams showing examples of variable tiers of caches accessible via a cache framework at different times, according to one or more example implementations.
Figure 6B:
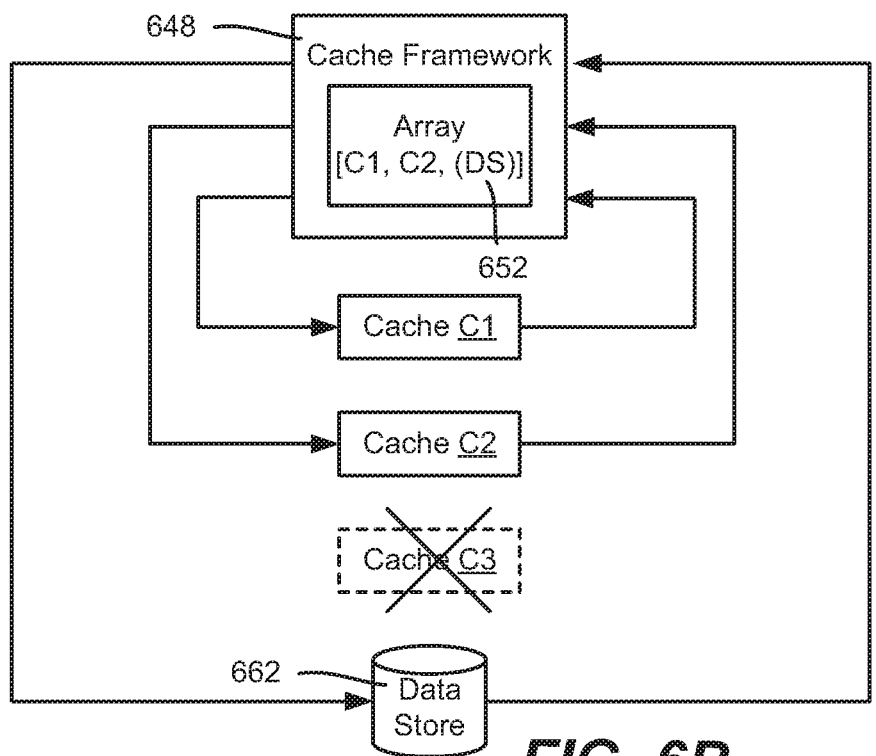

FIGS. 6A and 6B show the concept of multitier caching with variable cache tiers C1-C3 (FIG. 6A) and C1-C2 (FIG. 6B). In FIG. 6A, the cache framework 648 uses the declared array 652 to access each cache C1-C3 as appropriate. At another time, the array 652 is declared to only reference caches C1-C2, with the resources used for C3 reallocated, for example. As can be readily appreciated, the array may be re-declared at any suitable time, e.g., the configuration of FIG. 6B can go to and from that of FIG. 6A, and indeed, any practical number of tiers may be made available at any time. Note that in FIGS. 6A and 6B, the peer approach again is illustrated, as the last access location is the data store 662; however it is understood that multitier caching with variable cache tiers similarly works with the hybrid approach.

Further note that it is feasible to pre-populate a cache, at least to an extent, before that cache is declared and used by the cache framework. If used, a separate process may perform such cache data pre-population for example, and/or the cache framework, for example, may start writing through data to such a cache for some time before the cache is used for read through data access.

Figure 7:
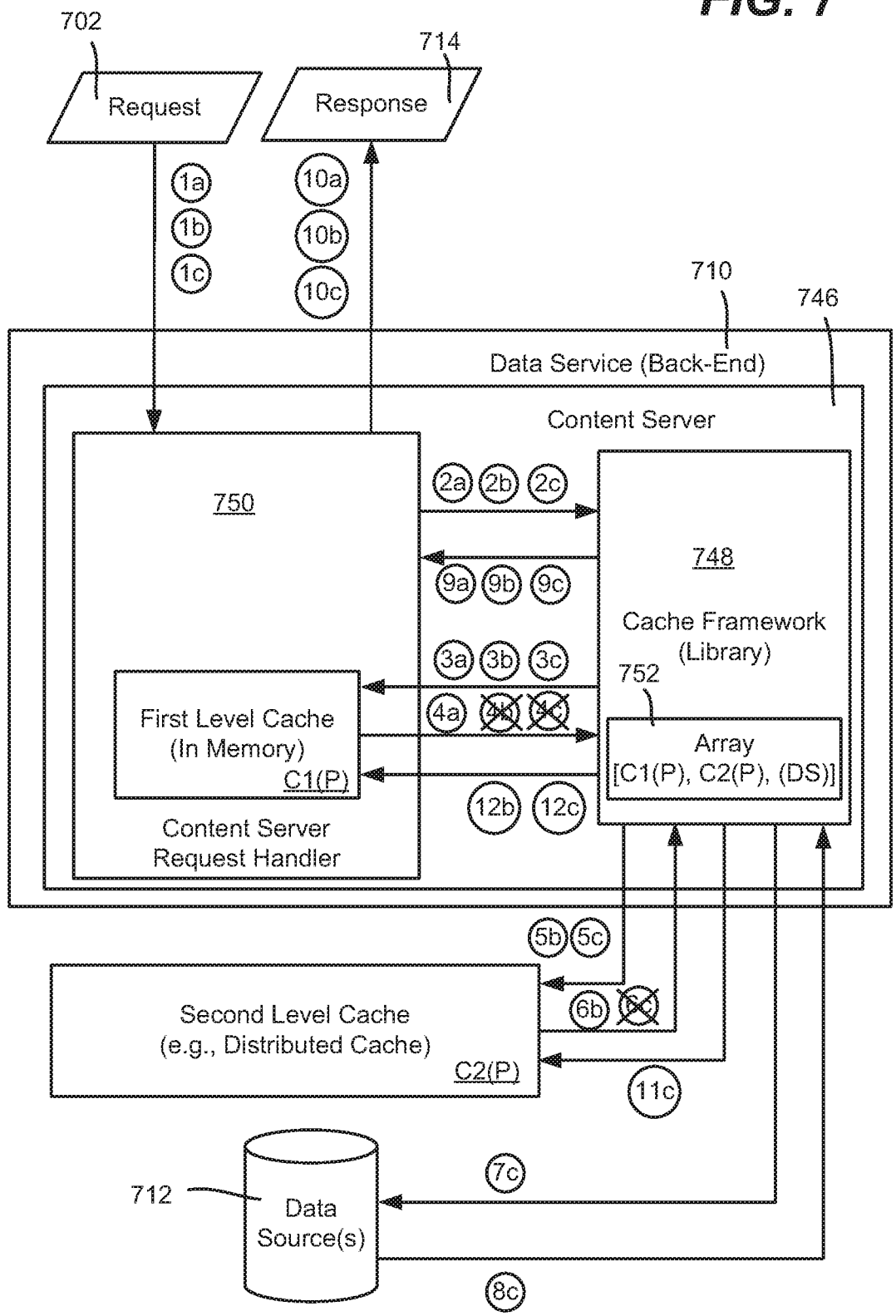
FIG. 7 is an example representation of components that handle batch requests for data, including via a multitier cache framework, according to one or more example implementations.

Turning to another aspect, FIG. 7 shows how a cache framework may be used for handling batch responses with batch requests with a multitier cache architecture. Again, a peer approach is exemplified in FIG. 7, however it is understood that batching in this way also works with the hybrid approach.

In FIG. 7 a batch request 702 reaches a service, which in this example is the data service 710, e.g., a back-end service. The batch request 702 includes a request for three data items (a), (b), and (c), represented by labeled arrows (1a), (1b) and (1c). A request handler 750 of the data service 710 is shown as working with a cache framework library 748 to obtain the requested data. Part of this is represented by the arrows labeled (2a), (2b) and (2c) in FIG. 7.

With batched requests, the cache framework 748 attempts to obtain data from each cache, shown as a first tier level cache C1(P) and a second tier level cache C2(P) in the example of FIG. 7. Thus, the cache framework 748 looks for the data in the first tier level cache C1(P), represented by the arrows labeled (3a), (3b) and (3c).

In this example, only one cache hit occurs, corresponding to the arrow labeled (4a) as returned from cache C1(P); generally keeping with the above examples, the labels (4b) and (4c) are "X'd" out to indicate a cache miss at this cache tier C1(P).

The cache framework library 748 (or other suitable component) holds onto the data item (a) corresponding to the request (1a), and continues looking for the data items (b) and (c), as represented by the arrows labeled (5b) and (5c) seeking the data in the second tier level cache C2(P). In this example, again only one cache hit occurs, corresponding to the arrow labeled (6b) as returned from cache C2(P); in keeping with the above examples, the label (6c) is "X'd" out to indicate a cache miss at this tiered cache C2(P). The cache framework library 448 holds onto the data item (b) corresponding to the initial request (1b), and continues looking for the data item (c).

Because there are no more actual caches listed in the array 752, the needed data item (c) is obtained from the one or more data sources 712 via the arrows labeled (7c) and (8c) (which the framework may consider another cache). This item (c), along with the other data items (a) and (b), is returned in a response 714 via the arrows labeled (9a), (9b) and (9c) and (10a), (10b) and (10c).

Further, because data items (b) and (c) were requested and missed in cache C1(P), data item (c) is written to cache C2(P) at arrow (11c). Similarly, data items (b) and (c) are written to cache C1(P) at arrows (12b and 12c). As can be seen, batch requests may be made entirely transparent to the calling entity via the logic of the cache framework 448, which retrieves each piece of data from the lowest (typically fastest) tier available. The requested batch data may be returned in an ordered batch response.

However, FIG. 7 is only one suitable example implementation. For example, it is feasible for the cache framework to separately return each piece of batched data as soon as retrieved, e.g., in a data "stream" provided some mechanism is used to identify the position of each item in the batch ordering. With an ordering mechanism, it is also feasible to separately return subsets of the batched data, e.g., a subset retrieved from cache level 1, another subset from cache tier level 2 and so on. The caller need not care why the data are grouped in subsets, only that the requested data is returned with a way for the caller to match each piece of data back to the corresponding request in the batch.

Other alternatives include parallel and/or asynchronous operations. For example, in FIG. 7, it is feasible for one or more write through operations to take place while waiting for data. For example, the write through represented by arrow 12(b) can occur before arrow 8(c) returns with the data for the data item (c) from the data sources 712.

It should be noted that if the data is expired in a cache, in one or more implementations this may not be treated as a conventional cache miss. Instead, the cache framework may return the data as is, possibly with some indication indicating the data is expired. This allows the use of the stale data if desired. For example, consider that an attempt to build requested data fails, such as because a database is down, or the build operations are taking too long to complete. In some scenarios, returning or using stale data is better than returning an error, or taking so long that the user becomes frustrated. Returning or using stale data allows the caller of the cache framework to make such a decision, such as upon receiving an error or timeout in response to a build attempt.

As can be readily appreciated, in one or more implementations, the different cache levels may not be exactly synchronized, e.g., a user may get expired data from a lower tier cache even though a higher tier cache has fresh data. Various ways to handle such scenarios are feasible, e.g., only return stale data from the last cache accessed, or return it right away on the likelihood that if expired in one cache, it is expired in all, and/or because caches typically are relatively close to being synchronized within an acceptable time window.

Figure 8:
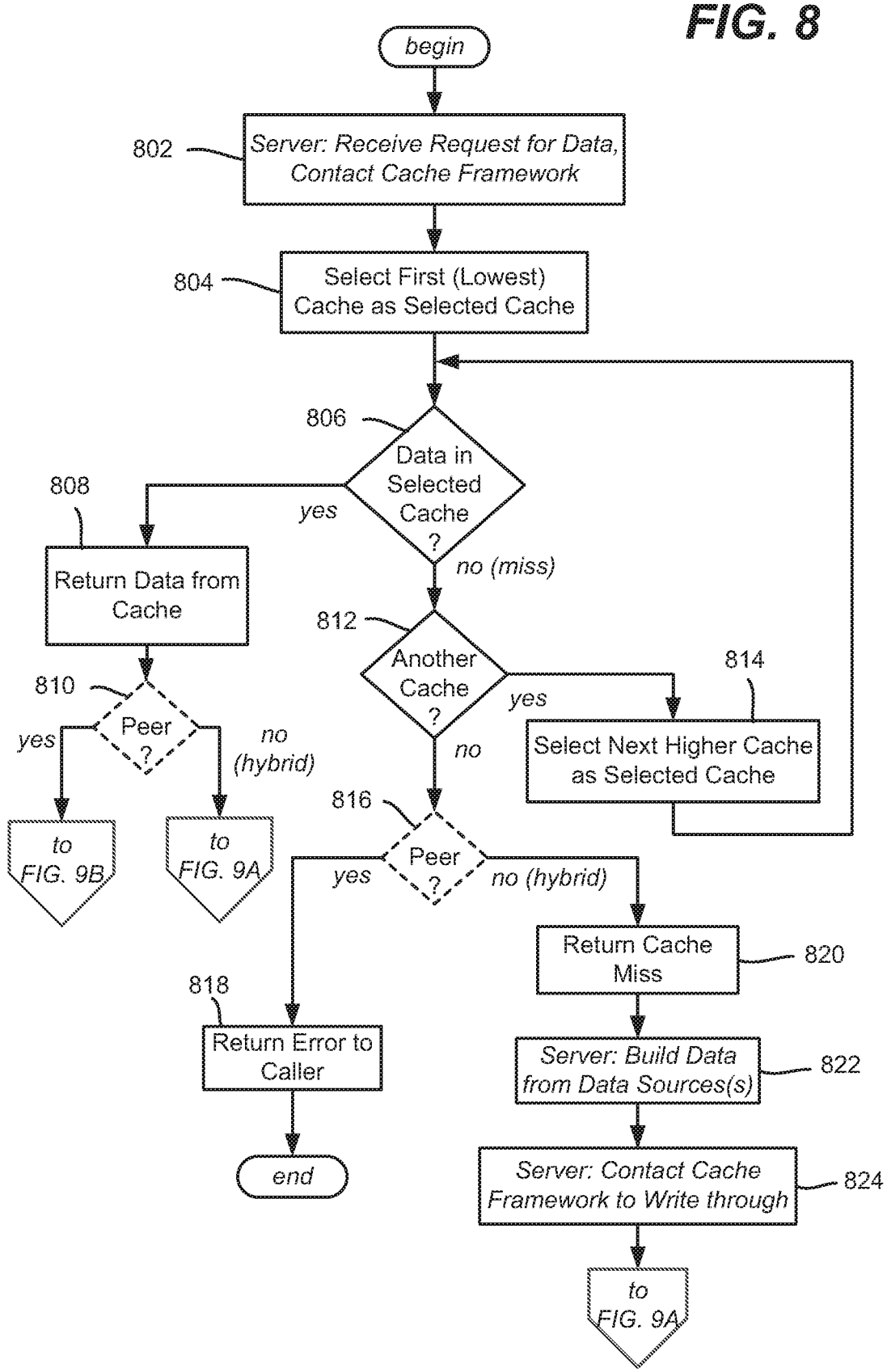
FIG. 8 is a flow diagram showing example logic/steps that may be performed by a cache framework to retrieve a data item, according to one or more example implementations.

Turning to example logic of a cache framework, FIGS. 8 and 9 represent operations that may occur with respect to a request for a single data item. Step 802 represents a service receiving a request for data from a caller and contacting the cache framework.

Step 804 represents the cache framework selecting its first cache, that is, its lowest cache as the selected cache. Step 806 checks whether the data is in this currently selected cache. If so, step 808 returns the data from the cache, and the retrieval portion of the cache framework operations are complete for this item. Step 810 establishes that for the hybrid model any write through operations are to take place via FIG. 9A, while for the peer model any write through operations are to take place via FIG. 9B. Note that step 810 may not actually exist in a given implementation, e.g., as a cache framework may be designed for a given approach; (thus step 810 is shown as a dashed decision step).

If not in the selected cache at step 806, step 812 evaluates whether there is another cache in the tier. If so, step 814 selects the next higher cache as the selected cache, and returns to step 806 to look for the requested data item in this newly selected cache. These steps continue until data is found in a cache at step 806 and returned at step 808, or no caches remain to check.

If no caches remain, further cache framework operations depend on whether the architecture is based upon the peer approach or the hybrid approach, as described in the above examples. Step 816 represents such a determination (step 816 may not actually exist in a given implementation and is thus shown as a dashed decision step).

If the peer-approach, then the cache framework should have obtained the data from one or more data sources, as those are considered one or more caches which should always have the data; an error occurs if not found, (e.g., there is no such data, or the data source did not respond for some reason), as represented at step 818. In one or more implementations, in general the data sources are treated agnostically by the peer-approach cache framework, insofar as the cache framework does not know that the data provider is a data source and not another cache.

If the hybrid approach, then the cache framework returns a cache miss to the caller at step 820, e.g. the server, to indicate that the server is responsible for building the data, e.g., from a back-end data service. Note that in one or more implementations, the back-end service does not compose the data received from its caches and/or multiple sources, but returns the data item(s), e.g., to the invoking entity for composition.

Step 822 represents the (e.g., front end) server building the data. Once built (or in conjunction with building), step 824 contacts the cache framework to perform the cache write through operation(s) as represented in FIG. 9A.

Figure 9A:
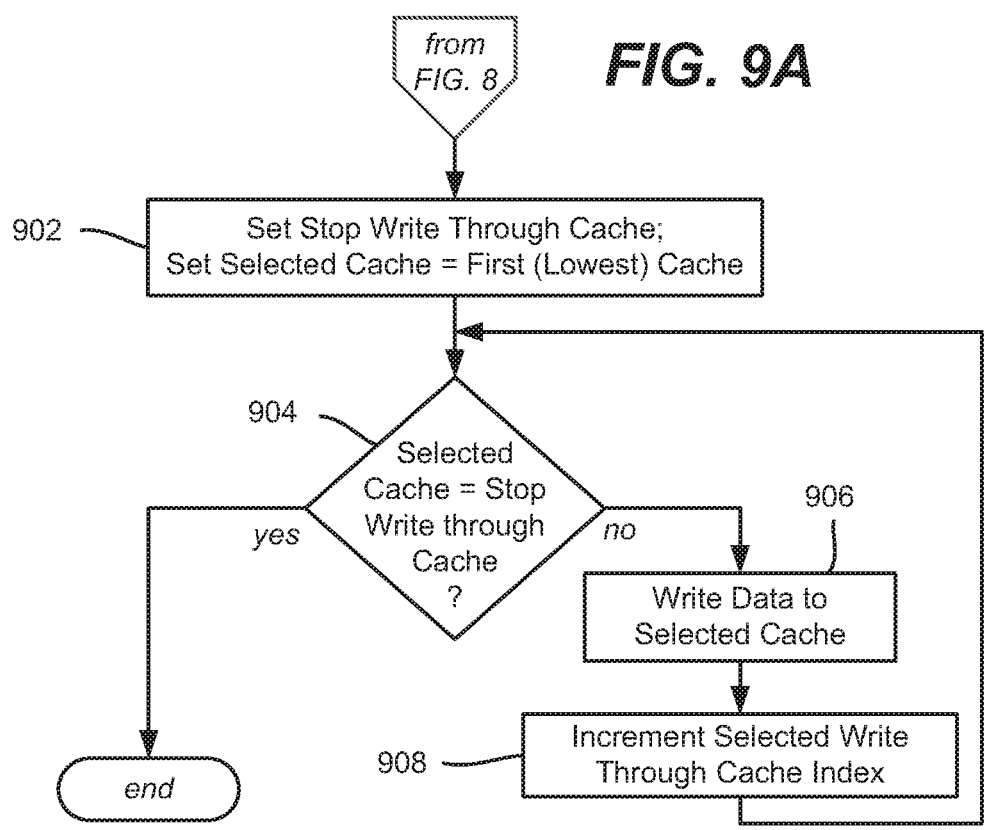
FIGS. 9A and 9B are flow diagrams showing example logic/steps that may be performed by a cache framework to write a retrieved data item to one or more lower caches, according to one or more example implementations.

FIG. 9A represents the write through operations of the cache framework, e.g., in array order for the hybrid approach. Step 902 sets the cache array index to the first (lowest) cache, and sets the "stop" write through cache point, which is the tier level where the data was obtained if returned at step 808 of FIG. 8, or one level greater than the highest cache index in the array if step 820 returned a cache miss. Step 904 evaluates whether the currently selected cache (the cache that provided the data, as determined in FIG. 8) is the write through cache, and if so, the write through process ends; thus, if the data was obtained from the first (lowest-level) cache listed in the array, then no write through operations are needed and none occur.

If the write through cache index is not at the stop cache index, step 906 writes the data to the selected write through cache. Step 908 selects the next cache index to select the next cache listed in the array as the next write through cache, and returns to step 904 to continue the write through operations until the stop cache index is reached, as evaluated by step 904.

Figure 9B:
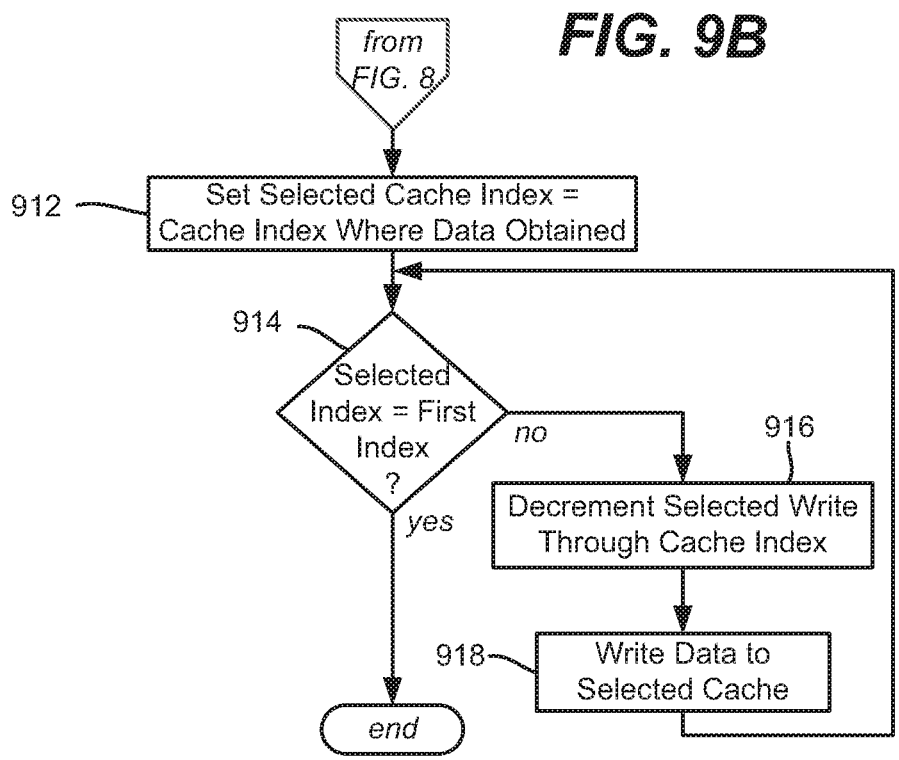

FIG. 9B represents alternative write through operations of a cache framework, e.g., in descending level order for the peer approach. Step 912 sets the selected cache array index to correspond to the tier level where the data was obtained. Step 914 evaluates whether the currently selected cache index (corresponding to the cache that provided the data, as determined in FIG. 8) is the first index, and if so, the write through process ends; thus, if the data was obtained from the first (lowest-level) cache listed in the array, then no write through operations are needed and none occur.

If the write through cache index is not the first index, step 916 decrements the write through cache index, and step 918 writes the data to the write through cache corresponding to the array index; (e.g., if the data was obtained from tier level 3, the data is written to tier level 2, and so on). The process returns to step 914, which continues the write through operations until after the first (lowest) cache is written at step 918, as evaluated by step 914. Note that if the peer approach is used, the selected "cache" actually may be the data source level, but because this is considered another (the highest-level) cache in one or more implementations, the process writes through to each lower-level actual cache.

Figure 10:
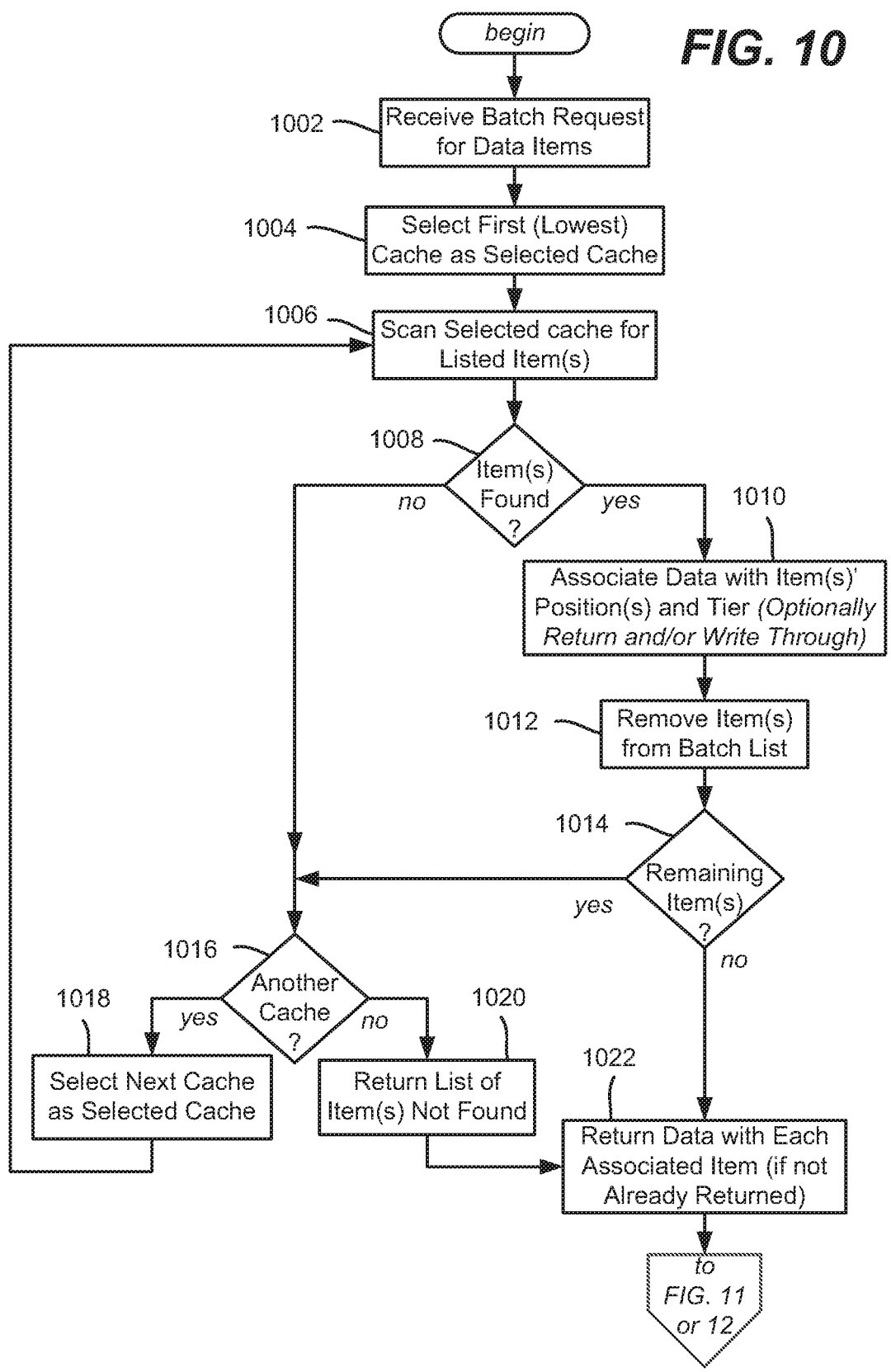
FIG. 10 is a flow diagram showing example logic/steps that may be performed by a cache framework to retrieve a batch of requested data items, according to one or more example implementations.
Figure 11:
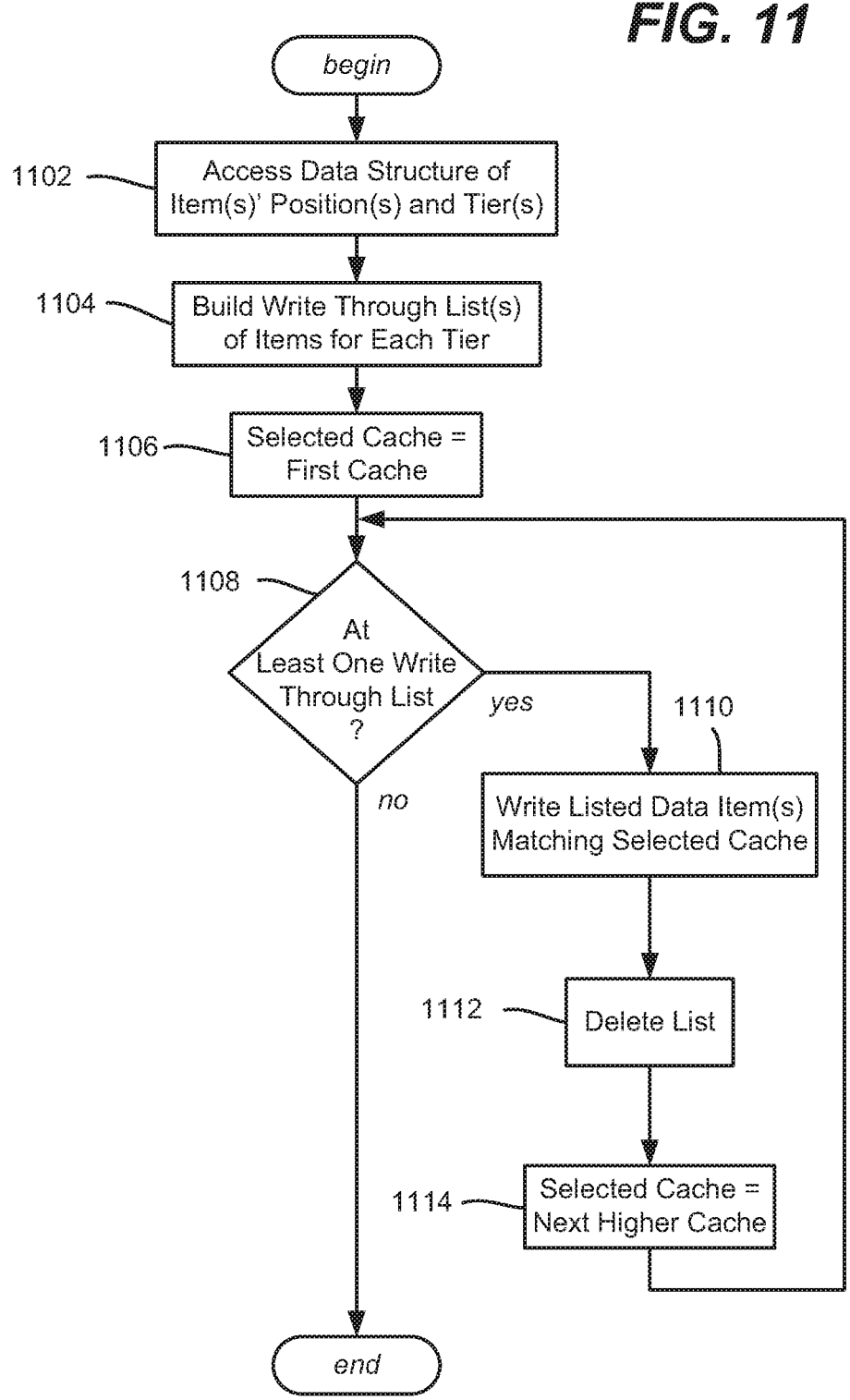
FIG. 11 is a flow diagram showing example logic/steps that may be performed by a cache framework to write a batch of retrieved data items to one or more lower caches, according to one or more example implementations.

FIGS. 10 and 11 (or FIGS. 10 and 12) represent operations of a cache framework with respect to handling a batch request for data items. In general, starting with the lowest cache first, the requested items are scanned for in the cache. For each item, if found the request is satisfied with respect to that item; if not found, the framework incrementally moves higher to look in each tiered cache until each data item is located or no caches remain. Note that it is alternatively feasible (although in practice less efficient in at least one implementation) to individually select each requested item and attempt to find that item in a tiered cache before moving to the next item, and so on.

Step 1002 represents receiving a batch request for data at the cache framework. Step 1004 selects the first (lowest) cache in the cache tier as the currently selected cache for data access.

Step 1006 scans the first cache for the items in the batch request, e.g., as maintained in a batch list or other suitable data structure. Note that in one or more implementations, the cache can be accessed for multiple items at once; however in implementations where this is not available, an attempt is made to look in the selected cache for each individual item in the list. Also note that if requested data is cached but expired, that is, is stale, that data may be considered a cache miss; (although stale data sometimes may be returned as described herein).

Step 1008 evaluates whether at least one item is found in the selected cache; (if not, step 1008 branches to step 1016, described below). If at least one item was found, for each found item step 1010 associates the data with its item position relative to the batch of items requested and the tier from which the item was obtained. Note that the item position association is for keeping the returned batched items in the proper order; an alternative is to fill in an array or the like with each item's data at the appropriate batch item position, and then return the array in response to the batch request. The association with the cache tier level is performed for write through operations, unless the write through operations are performed as soon as the data is retrieved from a cache or the data sources. An alternative is to maintain a write through list based on the cache tier in which each item was found, e.g., if the data for item A was cached at cache tier level 3, add item A to a cache tier level 2 write through list, and also to a cache tier level 1 write through list.

Step 1012 removes each obtained item from the batch (remaining) items list, as each such located item no longer needs to be obtained. Step 1014 evaluates whether any remaining item or items need data returned to satisfy the entire batch request. If all items have been found, step 1022 returns the data for each item. Note that an alternative to steps 1010 and 1022 is to return each item's data as it is found in a streaming fashion, rather than in a single batch response to the batch request, provided that the requesting entity understands the protocol. Streaming data for the items may be in a different order from the batch request as long as the item position or item identifier is maintained and returned with the data obtained for the item. The requesting entity may then use the items as received rather than wait for the full set of items to be returned in a complete batch response. Thus, step 1010 optionally provides for returning each item when its data is obtained, while step 1022 indicates that the data may have already been returned (via step 1010).

If no items are found in the cache at step 1008 or items remain at step 1014, step 1016 determines whether there is another cache to access. If so, step 1018 selects the next cache, and the process returns to step 1006 to scan for any listed item or items that remain. If there is no further cache from which to attempt access, then step 1020 may return a list of the item or items not found to the requesting entity, along with the set of those obtained (step 1022).

Note that in the hybrid approach, the list of not found items may be used to request those items from the back-end data service. In the peer approach, the list of not found items may be used to return an error message for each item because in the peer approach it is an error if the data is not found; (however in in one more implementations, if stale data exists and is allowed to be returned rather than no data, such stale data may instead be returned).

Figure 12:
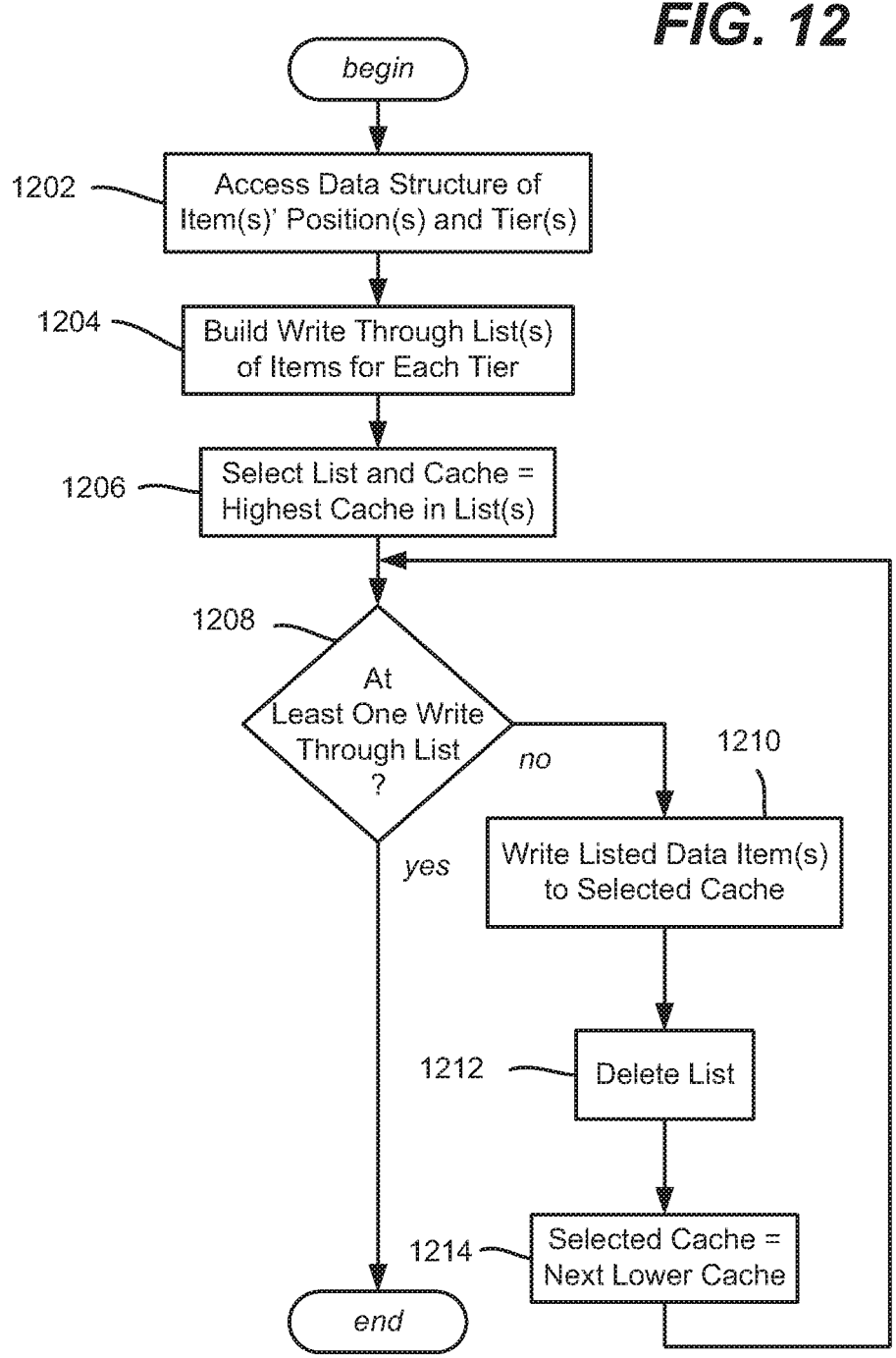
FIG. 12 is a flow diagram showing example logic/steps that may be performed by a cache framework to write a batch of retrieved data items to one or more lower caches, according to one or more example implementations.

The process then moves to the write through operations as described with reference to FIG. 11 (hybrid approach, in which write through operations proceed from lowest to highest caches as appropriate) or FIG. 12 (peer approach, in which write through operations proceed from highest to lowest caches as appropriate). FIGS. 11 and 12 assume that write through operations were not already performed as the data was found (e.g., via an option in step 1010) or at some other earlier time, and that there is an association for each item with the tier at which the item was located. Thus, FIGS. 11 and 12 are only examples for purposes of description in which write through operations are represented as occurring after the data is returned; as can be readily appreciated, write through operations may occur whenever data is ready, (such as while the front end service is awaiting data items from the back end service, the front end service may write through items found in any higher-level front-end cache to any lower level front end cache). The same is possible for the back-end service write throughs.

FIG. 11 represents the write through operations for a batch of retrieved items, in which the items are written from lowest cache to highest cache, e.g., in the hybrid approach. Note that if an item was found via the back end data service rather than in a front-end cache, the item is to be written through to each front-end cache from the first to the highest front-end cache level.

Step 1102 accesses the data structure that maintains the items and their respective associated tiers. Step 1104 builds a list for writing each tier, (if any are needed), although as set forth above, such a list or lists may be built and maintained dynamically, e.g., at step 1010. By way of example, consider that items A, C and E were obtained from cache level 3 and items B and D were obtained from cache level 2. Since write through is to each cache below the tier at which the data were found, the list for cache level 2 is items A, C and E, and the list for cache level 1 is items A, B, C, D and E. Because writes "bubble-up" in the hybrid approach, step 1106 selects the first cache as the selected cache.

Step 1108 evaluates whether there is any write-through list. For example, if each item was found at cache level 1, then no write through operations are needed and no lists exist. If none, the process ends.

Otherwise step 1110 writes the listed items matching the selected cache level to the currently selected cache. In the above example, items A, B, C, D and E are listed for cache level one and are thus written at step 1110. Note that in one or more implementations, writes may be sent as a group to the cache, while in other implementations writes may be sent individually.

Step 1112 deletes the list, and step 1114 selects the next higher cache level, which is level 2 in this example at present. The process returns to step 1108.

Step 1108 again checks whether a list for write through exists for the selected level; in the above example there is one for cache level 2, containing items A, C and E. Step 1110 thus writes these items to cache level 2. Step 1112 deletes this list, and step 1114 selects the next cache, level 3.

This time, however, when the process returns to step 1108, there are no lists remaining, and the write through process ends.

The write through for the peer approach is shown via FIG. 12, which is similar to FIG. 11 except that writes occur from the higher level cache(s) towards the lowest-level cache. Thus, step 1202 accesses the data structure and step 1204 builds the write through list or lists, if any, one for each level. Step 1206 selects the highest level cache having a corresponding list.

If there is no such list, then as before, no write through operations are needed, whereby step 1208 ends the process. Otherwise, step 1210 writes the items from the list to the selected, corresponding cache, step 1212 deletes this list, and step 1214 moves down to the next lower cache level, (if any). The process continues until no lists remain at step 1208.

Again, it should be noted that alternative implementations allow write through operations to occur as an item is received, or at any other appropriate time. Therefore, the write through operations need not occur in the batch order as long as some tier level indication is used with each item to identify which cache or caches the write through operations need to take place.

Figure 13:
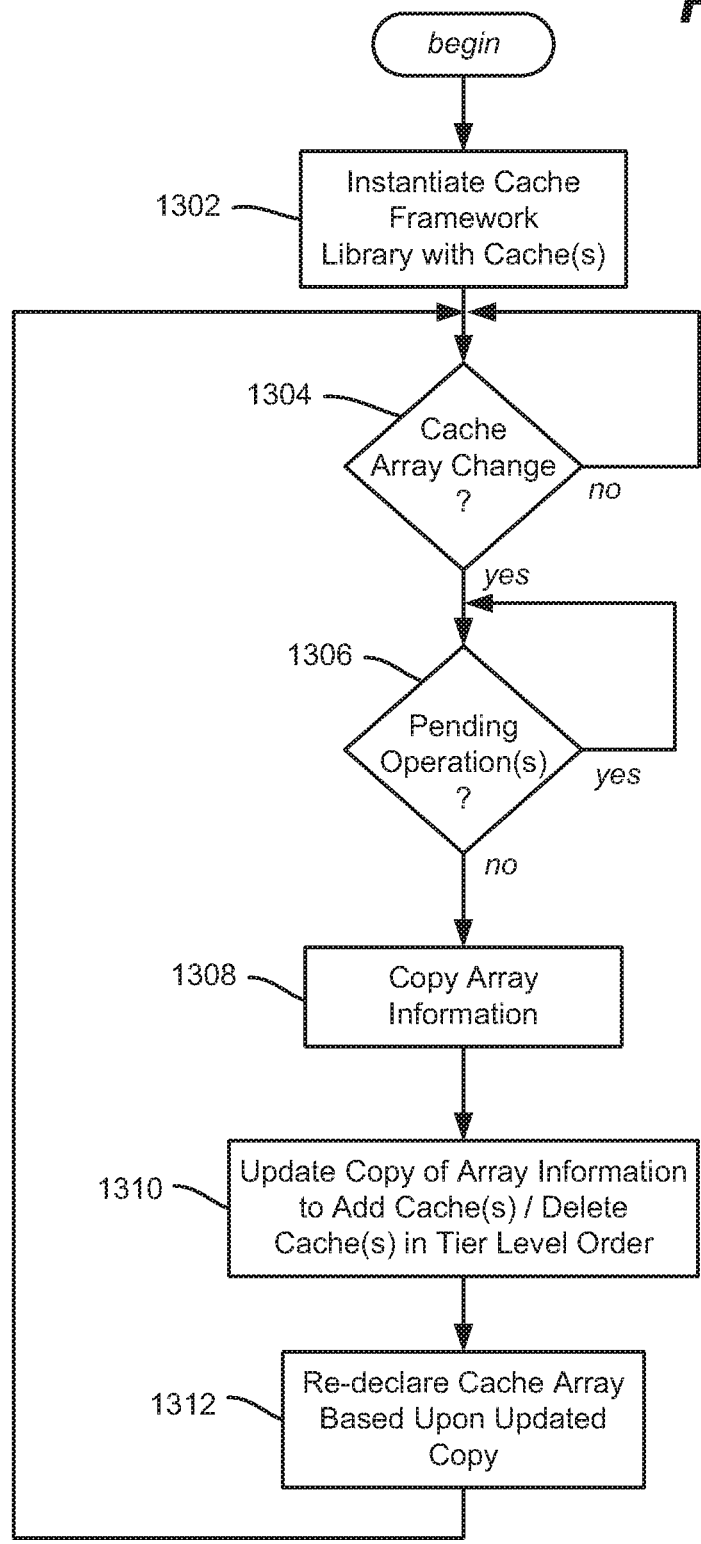
FIG. 13 is a flow diagram showing example steps that may be taken to vary a tier of caches available to a cache framework, according to one or more example implementations.

FIG. 13 represents example logic that may be used when the cache framework has one or more new caches available and/or has one or more existing caches removed. Step 1302 represents instantiating the cache framework library with one or more caches. Step 1304 represents waiting (typically not actually looping) until a cache array change is requested, e.g., by the service that instantiated the cache framework. If a change is requested, step 1306 represents completing any pending (as well as any ongoing) read through and/or write through operations. Further read and write operations may be held until the new tier is declared and ready.

With one possible mechanism, the cache framework may be provided with pointers or the like to one or more caches to insert (along with an indication of each tier level) and or one or more caches to remove. If so, the existing array may be updated; for example step 1308 may copy the current array information, for updating with the provided array information at step 1310. Step 1313 may then re-declare that cache array based upon the updated copy. Alternatively, another mechanism instead may provide the cache framework with an updated array, which is then re-declared following step 1306.

As can be seen, a cache framework accesses a tier of caches to attempt to find data to satisfy a request for data, including a single data item, or a dataset comprising one or more data parts or a batch of data items. The cache framework may be implemented at a front-end service level server, a back end service level server, or both. The cache framework handles read-through and write-through operations, including for batch requests. Via a data structure such as an array, the cache framework also facilitates dynamically changing the tier structure, e.g., for adding, removing, replacing and/or reordering caches in the tier.

One or more aspects are directed towards a cache framework, in which the cache framework is coupled to a data structure that identifies a plurality of caches in a cache tier order. The cache framework is further coupled to a requesting entity that makes a request for data. The cache framework attempts to return the data in response to the request, including to read the data structure to access each cache according to the tiered order until the data is obtained from a cache, or to return an indication that at least part of the data was not obtained from a cache.

The cache tier order may include an in-memory cache as a lowest level cache, in which the in-memory cache is in a same machine as a server that includes the cache framework and/or cache tier order may include a distributed cache shared by a server that includes the cache framework and at least one other server. The cache framework may comprise an instantiated library.

The data structure may identify the plurality of caches as an ordered set, and the data structure or information in the data structure may be dynamically variable to dynamically change the ordered set to a different set of one or more caches and/or to a different cache order.

The cache framework may be configured to write through data to one or more caches of the plurality of caches.

The cache framework may operate on a server of a front-end data service, and the front-end data service may be coupled to communicate a request for data to a back-end data service upon a return of the indication from the cache framework that at least part of the data was not obtained from a cache.

The cache framework may operate on a server of a back-end data service, and the back-end data service may be coupled to a front-end data service to receive a request for data from the front-end data service, to obtain data to respond to the request from the front-end data service, and to communicate a response to the front end data service that includes the data.

The cache framework may operate on a server of a back-end data service, and the data structure may identify at least one cache that is a virtual cache corresponding to a backing data source. The back-end data service may be coupled to a front-end data service to receive a request for data from the front-end data service, to attempt to obtain the data to respond to the request from the front-end data service, and to communicate an error to the front-end data service upon a return of the indication from the cache framework that at least part of the data was not obtained from a cache The request for data may comprise a batch request for data items, and the cache framework may access a lowest cache to attempt to locate data for the data items, and for each data item not found, may access a higher cache to attempt to locate data for the data items until each data item is found or no higher cache remains to access.

The cache framework may write through data to any lower cache if the data is located in a higher cache relative to that lower cache.

One or more aspects are directed towards receiving a request for a batch of data items and selecting a lowest cache in a tier of caches as a selected cache. Aspects include attempting to locate data for each data item in the selected cache for which data has not been obtained, determining if data has been obtained for each data item, and if so, returning the data for each item for which data was obtained from a cache in response to the request. If data has not been obtained for each data item, aspects include determining if a cache that is higher in the tier relative to the selected cache has not been accessed for data based upon the request. If a higher level cache exists, described is selecting a next higher cache in the tier as the selected cache and again attempting access the data from the next higher cache. If no higher cache exists, described is returning an indication of which data item or data items did not have data obtained from a cache, along with returning the data for each item for which data was obtained from a cache in response to the request.

The request for the batch of data items may correspond to a request received at a front-end data service. Upon returning the indication of which data item or data items did not have data obtained from a cache, the front-end data service may make a further request for data for the data item or data items to a back-end data service.

For any data obtained from a cache for a data item, aspects may include writing through the data for that data item to any lower cache relative to the cache from which the data for that data item was obtained.

Also described is receiving a change to the tier of caches.

One or more aspects are directed towards receiving a request for dataset comprising data for one or more data parts at a server of a front-end data service and providing the request to a cache framework running on the server. The cache framework accesses one or more caches from a lowest tier cache to a highest tier cache associated with the server until the data for each part of the dataset is obtained or no higher cache remains. If the data for each part of the dataset is obtained by the cache framework, the dataset is returned in response to the request; if the data for each part of the dataset is not obtained by the cache framework, any not obtained part of the dataset is obtained from another data source and the dataset is returned in response to the request.

If at least part of the data is obtained from another data source, aspects may include providing the dataset or each part of the dataset obtained from another data source to the cache framework, way if the cache framework writing each part of the dataset obtained from the other data source to at least one cache of the front-end service.

The other data source may comprise a back-end data service that invokes a back-end cache framework running on a back-end server of the back-end data service. The back-end cache framework may access one or more back-end caches from a lowest tier back-end cache to a highest tier back-end cache to attempt to locate each part of the dataset not obtained by the cache framework of the front-end data service server.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 14 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 14:
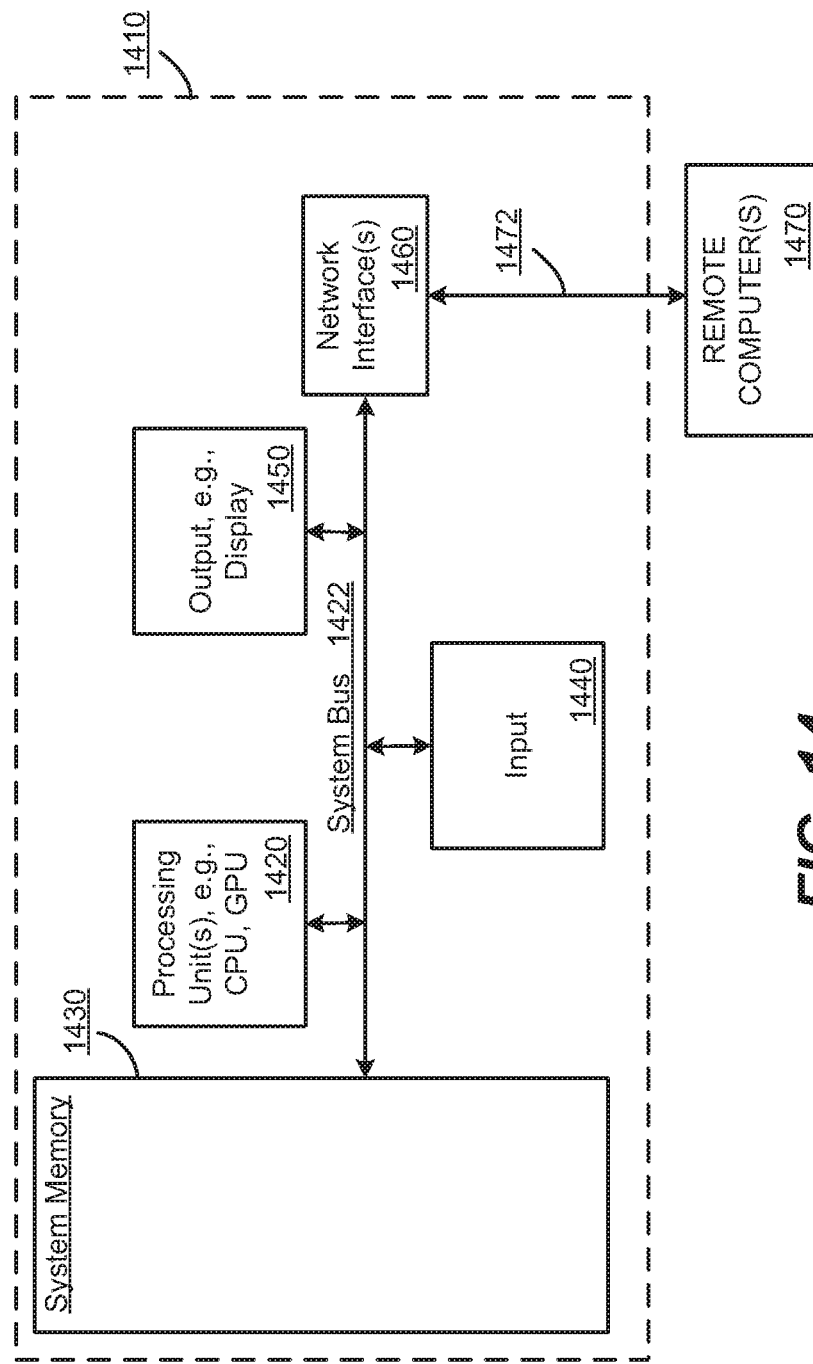
FIG. 14 is a block diagram representing an example computing environment into which aspects of the subject matter described herein may be incorporated.

FIG. 14 thus illustrates an example of a suitable computing system environment 1400 in which one or aspects of the implementations described herein can be implemented, although as made clear above, the computing system environment 1400 is only one example of a suitable computing environment and is not intended to suggest any limitation as to scope of use or functionality. In addition, the computing system environment 1400 is not intended to be interpreted as having any dependency relating to any one or combination of components illustrated in the example computing system environment 1400.

With reference to FIG. 14, an example device for implementing one or more implementations includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 typically includes a variety of machine (e.g., computer) readable media and can be any available media that can be accessed by a machine such as the computer 1410. The system memory 1430 may include computer storage media in the form of volatile and/or nonvolatile memory such as read only memory (ROM) and/or random access memory (RAM), and hard drive media, optical storage media, flash media, and so forth. By way of example, and not limitation, system memory 1430 may also include an operating system, application programs, other program modules, and program data.

A user can enter commands and information into the computer 1410 through one or more input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
    declaring, by a system comprising a processor, a data structure that represents a first tiered cache order that identifies at least one cache comprising a first cache and a third cache;
    responding to a first request for first data based on the first tiered cache order;
    prepopulating a second cache with a second dataset, the second dataset comprising at least some additional data that is not in a first dataset of the first cache;
    re-declaring the data structure to represent a second tiered cache order that identifies the at least one cache comprising the first cache and the second cache instead of the first cache and the third cache, wherein the second tiered cache order is based on respective speeds of caches of the at least one cache; and
    responding to a second request for second data based on the second tiered cache order, comprising returning a first part of the second data from the first dataset of the first cache and returning a second part of the second data from the second dataset of the second cache.

2. The method of claim 1, wherein the prepopulating the second cache with the second dataset comprises performing a write through operation using data obtained from at least one other data source.

3. The method of claim 1, wherein the prepopulating the second cache with the second dataset comprises prepopulating the second cache via a separate process.

4. The method of claim 1, further comprising receiving a third request for third data, wherein the third request comprises a batch request for a first data item and a second data item, and responding to the third request based on the second tiered cache order comprising returning the first data item from the first dataset of the first cache and returning the second data item from the second dataset of the second cache.

5. The method of claim 4, further comprising updating the first dataset of the first cache with the second data item.

6. A system, comprising:
    a processor, and
    a memory that stores executable instructions that, when executed by the processor, facilitate performance of operations, the operations comprising:
        serving a first request for first data based on a data structure that represents a first tiered cache order comprising at least one cache comprising a first cache and a second cache;
        prepopulating a third cache;
        changing the data structure to represent a second tiered cache order comprising the at least one cache comprising the first cache and the third cache, wherein the second tiered cache order is based on respective speeds of caches of the at least one cache; and
        serving, after changing the data structure to represent the second tiered cache order, a second request for second data based on the data structure that represents the second tiered cache order, comprising returning a first part of the second data from the first cache and returning a second part of the second data from the third cache.

7. The system of claim 6, wherein changing the data structure to represent the second tiered cache order comprises removing the second cache from the second tiered cache order.

8. The system of claim 6, further comprising a separate process, and wherein the prepopulating the third cache comprises running the separate process.

9. The system of claim 6, wherein the first cache comprises in-memory cache of a first server, and wherein the second cache and the third cache correspond to a distributed cache shared with the first server and at least one other server.

10. The system of claim 9, further comprising a data service coupled to the first server, and wherein the operations further comprise receiving a third request for third data, and serving the third request for the third data comprises accessing the first cache for the third data and determining a first cache miss, in response to the first cache miss, accessing the third cache for the third data and determining a second cache miss, and in response to the second cache miss, accessing the third data via the data service.

11. The system of claim 10, wherein the data service is identified as a fourth cache in the second tiered cache order.

12. The system of claim 6, wherein the operations further comprise prepopulating a fourth cache, changing the data structure to represent a third tiered cache order comprising the at least one cache comprising the first cache and the fourth cache and removing the third cache, and serving, after changing the data structure to represent the third tiered cache order, further requests for data based on the data structure that represents the third tiered cache order.

13. The system of claim 6, wherein the operations further comprise receiving a third request for third data, wherein the third request comprises a batch request for a first data item and a second data item, and serving the third request based on the second tiered cache order comprises returning the first data item from the first cache and returning the second data item from the third cache.

14. The system of claim 13, wherein the operations further comprise writing through the second data item to the first cache.

15. A non-transitory computer-readable medium comprising executable instructions that, when executed by a processor of a system, facilitate performance of operations, the operations comprising:
    serving a first request for first data based on a first tiered cache order that represents at least one cache comprising an in-memory cache and a first distributed cache part;
    prepopulating a second distributed cache part;
    changing the first tiered cache order to a second tiered cache order that represents the at least one cache comprising the in-memory cache and the second distributed cache part and not the first distributed cache part, wherein the second tiered cache order is based on respective speeds of caches of the at least one cache; and
    after the changing the first tiered cache order to the second tiered cache order, serving a second request for second data based on the second tiered cache order, comprising returning a first part of the second data from the in-memory cache and returning a second part of the second data from the second distributed cache part.

16. The non-transitory computer-readable medium of claim 15, wherein the operations further comprise receiving a third request for third data, wherein the third request comprise a batch request for a first data item and a second data item, and serving the third request based on the second tiered cache order, comprising returning the first data item from the in-memory cache and returning the second data item from the second distributed cache part.

17. The non-transitory computer-readable medium of claim 16, wherein the operations further comprise writing through the second data item to the in-memory cache.

18. The non-transitory computer-readable medium of claim 15, wherein the prepopulating the second distributed cache part comprises running a separate process.

19. The method of claim 1, wherein the first cache comprises in-memory cache of a first server, and wherein the second cache and the third cache correspond to a distributed cache shared with the first server and at least one other server.

20. The method of claim 1, wherein the first cache is faster than the second cache.

* * * * *